Jan. 21, 1969 A. J. ANTHONY ET AL 3,423,287
NUCLEAR REACTOR FUEL ELEMENT SUPPORT
Filed Sept. 21, 1965 Sheet 1 of 2
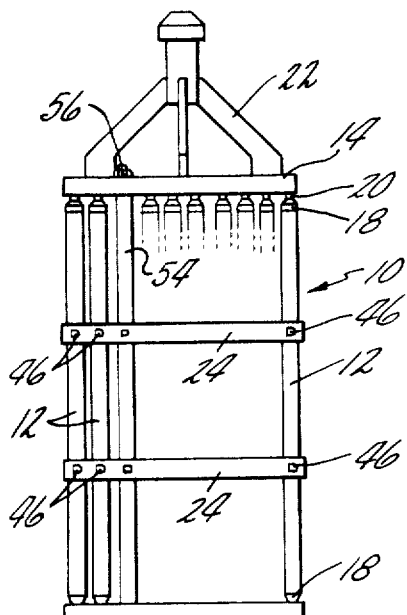
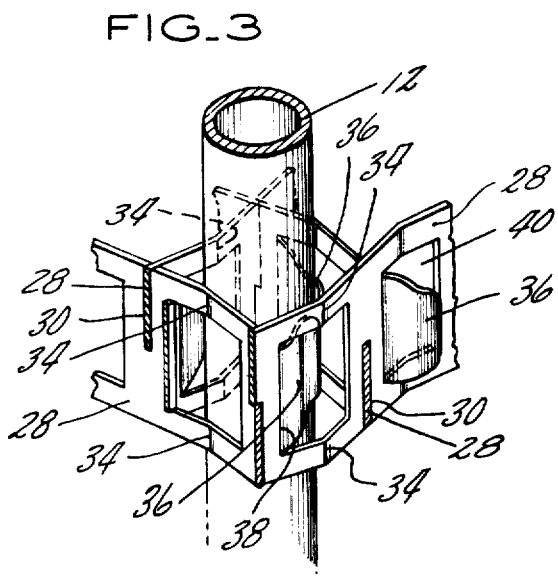
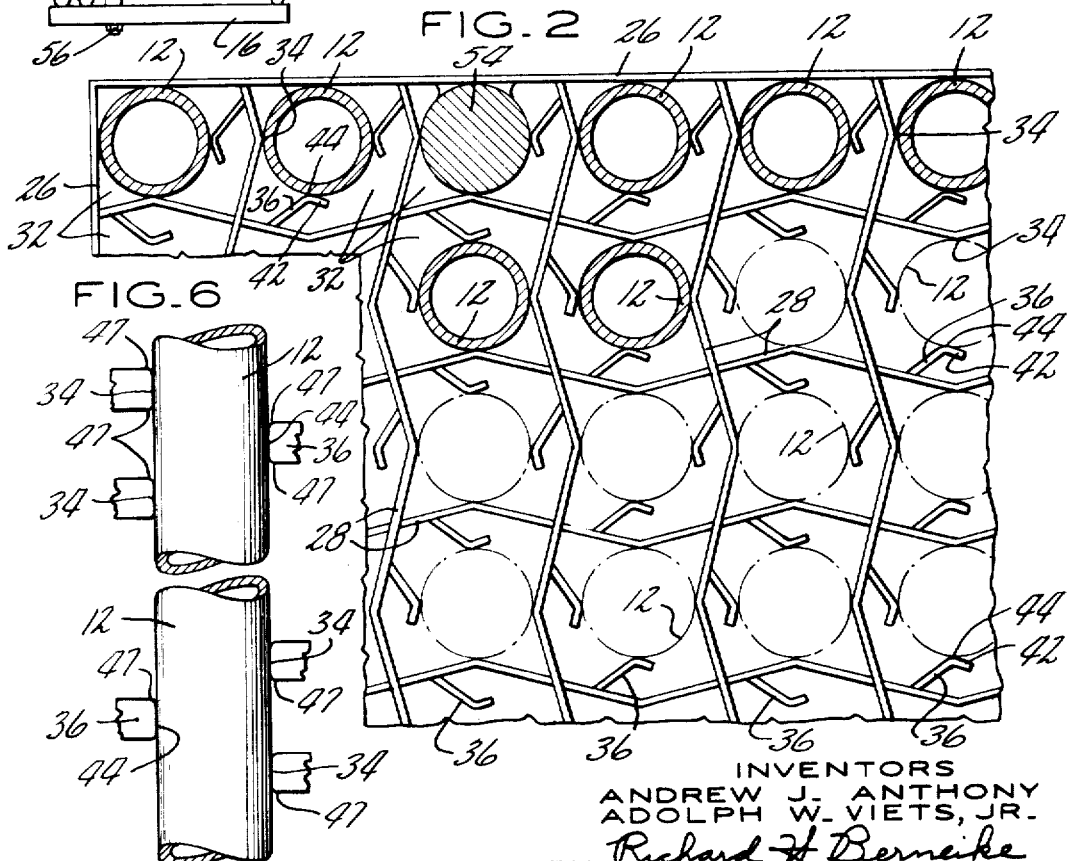
INVENTORS
ANDREW J. ANTHONY
ADOLPH W. VIETS, JR.
BY Richard H. Berneike
ATTORNEY INVENTORS
ANDREW J. ANTHONY
ADOLPH W. VIETS, JR.
BY Richard H. Berneike
ATTORNEY

United States Patent Office 3,423,287
Patented Jan. 21, 1969

3,423,287
NUCLEAR REACTOR FUEL ELEMENT SUPPORT
Andrew J. Anthony, Tariffville, and Adolph W. Viets, Jr., East Granby, Conn., assignors to Combustion Engineering, Inc., Windsor, Conn., a corporation of Delaware
Filed Sept. 21, 1965, Ser. No. 488,852
U.S. Cl. 176—78                16 Claims
Int. Cl. G21c 3/30

The present invention relates to nuclear reactors and more particularly to means for spacing and supporting fuel elements in bundles or assemblies in the reactor.

It is well known that the fuel or fissionable material for heterogeneous nuclear reactors is frequently in the form of a number of fuel elements or rods which are in turn grouped together in the reactor in bundles comprising fuel assemblies. The fuel elements themselves may comprise cladding tubes containing pellets or other forms of fissionable material. A plurality of these tubes are then joined together into a unit to form the fuel assembly. Each reactor has a number of such fuel assemblies therein comprising the reactor core.

Fuel elements are conventionally rather long thin tubes arranged in a spaced array in the fuel assemblies. Liquid, which may be serving as a moderator as well as a coolant, flows through the interstices between the fuel elements usually in a direction generally parallel with the fuel elements. The ends of the fuel elements in each bundle terminate at, and are suitably affixed to, header plates at each end. These plates are suitably apertured or otherwise arranged to permit the aforementioned liquid flow.

The fuel elements are of relatively great length as compared not only to their individual diameters but also as to the lateral dimension of the fuel assemby. For many reasons it is imperative that these long fuel elements are maintained in parallel alignment and that any bowing of the elements is prevented. Bowing or misalignment can be caused by a number of factors and can be further aggrevated by other factors. One cause of this bowing might be that the individual elements are initially bent and remain so when assembled. This means that the elements are closer together in certain portions of the assembly and that the area of the liquid flow path is altered in the same portion. These factors will cause flux peaking in the liquid channels adjacent the bowed elements as well as unequal distribution of coolant flow which will result in overheating of the fuel elements in that portion of the assembly. The fuel elements will then respond with correspondingly different thermal expansions or contractions so that the elements and the assembly may be subjected to additional bowing or deformations. Undesirable and unacceptable hot spots might, therefore, be produced within the fuel elements. The bowing of peripherally-located fuel elements can also jam or obstruct control rod movement. Another factor to be considered is the vibrations of the elements during operation since the rods are so long and limber and easily excited by flow induced vibrations. With small fuel element pitch or spacing, the vibration may be of such magnitude that the elements touch each other.

It has, therefore, become the practice to provide lateral spacing and support means along the length of the fuel assembly at selected location intermediate to the ends. Some of the prior support means employed require either welding or brazing to the individual fuel rods. This is undesirable because of the considerable labor and other expenses involved as well as the danger of rupturing the fuel cadding. Furthermore, welding not only prevents the unwanted lateral movement of the fuel elements but also prevents relative longitudinal movement between the elements which is undesirable. Such restraint prevents the free expansion of the fuel elements in the longitudinal direction due to unequal heating.

Other forms of prior support means have either caused excessive restriction of liquid flow between the elements or have not provided the necessary degree of support. Restriction of the liquid flow channel necessitates a larger circulating pump and may also cause the fuel assemblies to "float" in the core. Such a condition makes necessary a hold-down device sufficient to overcome the floating tendency. If the means employed provides insufficient support, there may be vibrations which will cause wear and fretting corrosion of the elements. This can eventually result in rupture of the elements and escape of radioactive fission products into the reactor coolant system.

The present invention accordingly has for an object the provision of novel and effective means for providing lateral support and spacing for the fuel elements in elongated fuel assemblies.

Another object of the invention is the provision of lateral joining means of the characteristic described which are adapted for securely and slidably engaging the individual fuel rods of the assembly so that differing degrees of thermal expansion among the fuel rods are permitted without resulting in bowing of the fuel elements or assembly.

Another object of the invention is the provision of lateral joining means of the characteristic described which can be fabricated readily and with a minimum of components.

Another object of the invention is the provision of lateral joining means which will introduce into the fuel assembly the minimum restriction to liquid flow.

These and other features, advantages and objects of the present invention will be explained more fully in, and will be apparent from, the following description of illustrative embodiments of the invention when read in conjunction with the accompanying drawings wherein:

FIG. 1 is an elevation view of a fuel assembly or bundle utilizing the spacing and support means of the present invention;

FIG. 2 is a plan section view of a portion of one of the spacing and support means of the present invention;

FIG. 3 is an isometric view of a portion of a fuel element and a portion of a spacing and support means according to the present invention;

FIG. 6 illustrates portions of a fuel element and the spacing and support means engaging the element.

Figure 4:
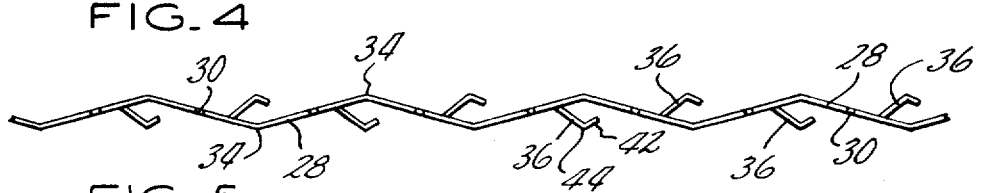
FIGS. 4 and 5 are plan and elevation views, respectively, of one of the components of the spacing and support means of the invention.

Referring first to FIG. 1 of the drawings, there is illustrated a fuel assembly or fuel bundle 10 comprising a plurality of fuel elements or rods 12. The elements in this assembly are spaced from each other and are arranged in a plurality of intersecting rows as shown in FIG. 2, thereby forming a rectangle. The fuel elements 12 are maintained in this spaced array by means of upper and lower header plates 14 and 16, respectively. The fuel elements are attached to these header plates by means of end caps 18. These end caps have protruding portions 20 which fit into apertures in the header plates. These protrusions are slideable within the apertures in the upper header plate so as to permit and compensate for unequal thermal expansion of the fuel elements. Attached to the upper header plate 14 is a cruciform 22 which serves as a lifting fixture as well as an aligning means for the upper end of the fuel assembly.

The spacing and support means 24 of the present invention which serve to laterally join the individual fuel elements together are shown in FIG. 1 between the upper and lower header plates. Although two of these support means have been illustrated, there could be only one or any other number necessary to provide adequate support. Around the periphery of the assembly encircling the rectangular array of fuel elements and forming the outside of the spacing and supporting means is an elongated metal strip 26. This perimeter strip of material constitutes a frame for the spacing and support means and is composed of four sides either joined together by welding or other suitable means or by bending a long strip to the required quadrangular shape.

Figure 5:
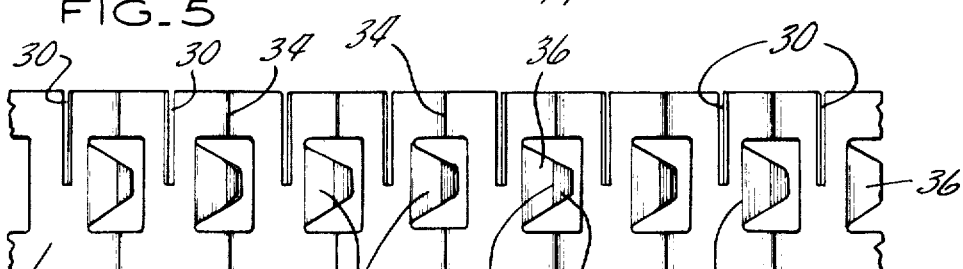

The frame 26 has within its boundaries a plurality of components or members 28 which together with the frame form a grid-like structure. A first group of these members 28 extend across the frame in one direction while a second group extend across the frame in the other direction perpendicular to the first group. These grid forming components or members 28 are formed from thin, elongated strips or bands of metal as best shown in FIGS. 3, 4 and 5. These members 28 have a plurality of slots 30 formed therein at regular intervals which permit the members to be interlocked together as shown in FIG. 3 in an "egg crate" fashion. The assembly of the frame 26 and the members 28 in this manner forms a plurality of fuel element or fuel rod compartments 32. The end of the members 28 are welded to the frame 26 at the point of juncture. The members 28 may also be welded to each other at the points of intersection although such welding is not an absolute necessity.

Each of the grid-forming members 28 is bent at a plurality of points 34 to form a somewhat undulating configuration. These bends occur generally at the mid-point between the slots 30 so that the bends occur at about the mid-point of the compartment 32. Each bend will extend outwardly from one compartment and into the adjacent compartment to form an arch therein.

Punched, cut or otherwise formed from the grid forming members 28 are spring means or tabs 36. These spring tabs are formed by severing the grid forming members 28 on three sides of a rectangle as shown in FIGS. 3 and 5 and then bending the spring tabs outwardly from the plane of the grid-forming member along the fourth side 38 of the rectangle. This leaves an aperture 40 in the grid-forming member itself. The side of the rectangle 38 by which the spring tab remains attached to the grid forming member is a side parallel to the liquid flow as well as parallel to the fuel elements. Such an arrangement means that the spring tabs as well as the arches formed by bends 34 will be aligned parallel to liquid flow so as to present the least projected area of resistance of liquid flow.

The spring tabs are cut and the apertures 40 formed mid-way between the slots 30 such that the apertures will be generally symmetrical with the bends or arches 34. The spring tabs 36 are bent from the plane of the grid-forming members 28 in the direction opposite to the direction of the bends 34 so as to extend into the compartments adjacent to the compartments that the corresponding bends extend into. The concave side of the arches will therefore be towards the corresponding spring tab. The end portions 42 of the springs 36 are bent back in the direction of the grid-forming member as shown in FIGS. 2 and 4. This formation of the spring tab provides a bend 44 which engages the fuel elements. This bend may, of course, be more of an arcuate deformation than a truly sharp bend.

As shown in FIGS. 2 and 3 the fuel elements extend longitudinally through each of the compartments 32. The fuel elements in each of the interior compartments of the grid are engaged on two adjacent sides by the bends or arches 34 in the grid-forming members 28 and on two other sides by the bends 44 in the spring tabs. Since the portions of the grid-forming members and spring tabs which engage the fuel elements are bent or curved away from the fuel elements, there is essentially line contact on all four sides between the elements and the support means. In some prior art devices there is either point contact, relatively short line contact or area contact. Support means having point contact and short line contact are more subject to wear and fretting corrosion at the point of contact. The present invention, on the other hand, provides relatively long line contact to reduce wear and corrosion. Line contact in preference to area contact is highly desirable since substantial area contact can promote excessive heating of the elements in the contact area.

Some prior art support devices have employed opposing springs to support the fuel elements while the present invention, on the other hand, employs springs only in opposition to relatively stiff arches. This serves to reduce the vibration amplitude. The stiffness of the arches also provides more precise location points for the fuel elements. The perimeter fuel elements are supported by combinations of spring tabs, arches and portions of that flat perimeter strip.

The perimeter strip 26 is punched out as at 46 in FIG. 1 at locations corresponding to the engagement of the perimeter strip with the fuel elements. These cut-outs permit local cooling of the fuel element cladding which touches the perimeter strip. The apertures 40 in the grid-forming member 28 in a like manner permit better cooling of the interior fuel elements. These cut-outs and apertures reduce excess material to permit the above-mentioned proper cooling while maintaining sufficient surface for contact with the fuel elements.

The arrangement of the present invention also has another advantage over the use of arrangements employing two opposed springs. With the use of springs directly opposite each other engaging the element for only a limited distance in the longitudinal direction, there can be considerable wobble or vibration about a point in the element adjacent the springs. In the present invention, on the other hand, the springs engage the elements on one side while the opposite arches engage the elements at points above and below the point of engagement with the opposite spring. This is clearly illustrated in FIG. 6 by the portions of the two grid supports shown. This "three point" engagement in each direction (six points all around the element) provides much more support than the "two point" engagement (four points all around) of opposing springs without increasing the contact area. Thus for the same spring strength the fuel elements are held more firmly.

There can be any number of spacing and support means 24 along the length of the fuel assemblies as previously stated. The assemblies are usually of such length that at least two are necessary. In order to lend more support and further reduce vibration, successive support grids are oriented such that the relative positions of the spring tabs 36 and arches 34 are reversed. This is illustrated in FIG. 6 in that the top support grid has the spring tab 36 on the right and the arches 34 on the left while the lower support grid has the spring tab 36 on the left and the arches 34 on the right. Such an arrangement of the grids does not normally required that the individual grids be constructed differently but only that they be inverted and possibly rotated relative to the adjacent grids.

FIGS. 2 and 5 illustrate that the spring tabs are cut down in size from the rectangular piece of material punched from the grid-forming members to form a somewhat trapezoidal spring tab. The formation of a constant stress spring would require that the tabs be cut down to triangular shape but this would render the line of contact between the springs and the elements too short. Therefore a compromise configuration is employed in which the tabs are reduced in size to approach a constant stress condition as well as to reduce the contact area without reducing it below a satisfactory minimum.

It is imperative that gouging and scratching of the fuel elements be prevented and there is particular danger of this during assembly of the fuel bundles when the elements are being inserted through the grids. To reduce the likelihood of this scratching, the leading and trailing edges 47 of both the arches 34 and the spring tab 36 are rounded off slightly as illustrated in FIG. 6.

Figure 7:
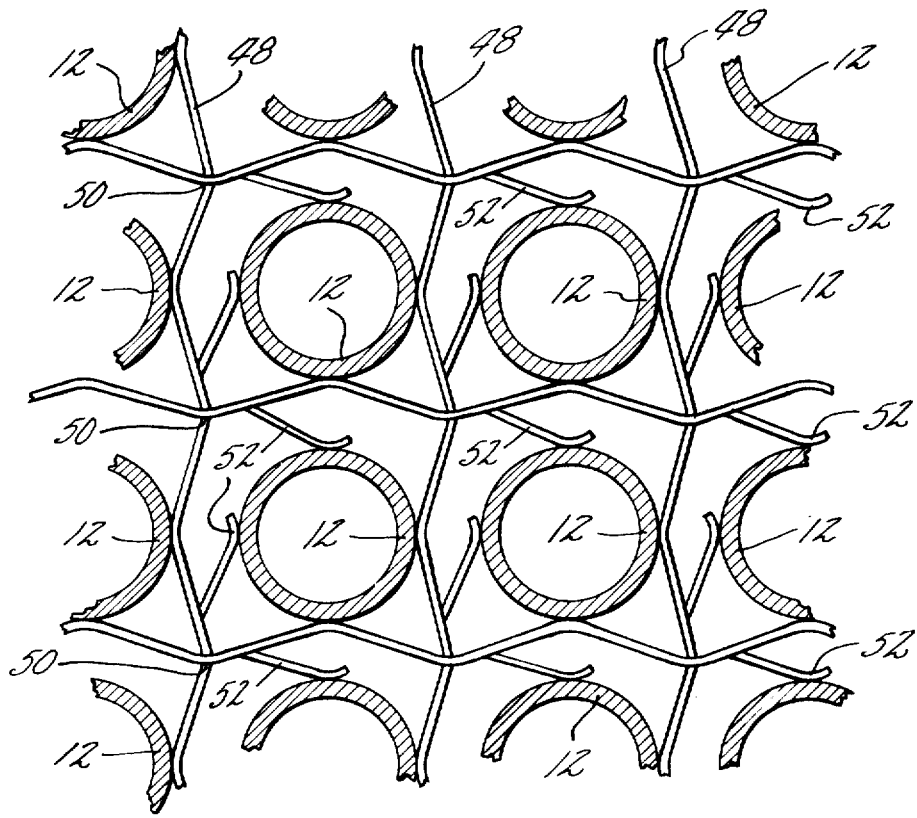
FIG. 7 is a plan view of a portion of a modified form of the spacing and support means of the present invention.

FIG. 7 illustrates a modified form of the invention in which the grid-forming members 48 are bent not only at locations corresponding to the mid-points of the compartments but also at the intersections 50 of the members 48. In this modified arrangement the spring tabs 52 formed from each of the members 48 all extend outwardly to the same side of the members 48. However, the elements 48 are formed into the grid in such a manner that each of the fuel elements is engaged by two springs and two arches in the same manner as in the FIG. 2 embodiment.

Since the spacing and support grids 24 are not affixed directly to the fuel elements but are slideable relative thereto, it is necessary to provide means for maintaining the grids in position. This can be accomplished by employing on or more tie rods 54 as illustrated in FIGS. 1 and 2. These rods, which may be either solid or tubular are welded to each of the support grids 24 and also affixed to the header plates 14 and 16, such as by nuts 56. These ties then retain the fuel assemblies together and maintain the support grids in position.

Although the invention has been disclosed with reference to the formation of the support grids from elongated strips of material with the spring tabs being formed therefrom, it will be appreciated that the support means of the present invention could be formed from many small pieces suitably affixed together such as by welding. The spring tabs could, for instance, be separate pieces of metal welded to the grid-forming members 28 or 48. Other numerous modifications of the invention can be made by those skilled in the art without departing from the spirit and scope of the invention as set forth in the appended claims.

We claim:
1. A fuel element support grid for supporting a plurality of nuclear fuel elements intermediate their ends comprising:
   (a) four side members generally forming a quadrangle;
   (b) a plurality of first grid-forming members within said quadrangle extending from one side of said quadrangle to the opposite side of said quadrangle, the ends of said first grid-forming members being attached to the side members adjacent said ends;
   (c) a plurality of second grid-forming members within said quadrangle extending from another side of said quadrangle to the opposite side thereby intersecting said first grid-forming members and forming a plurality of fuel element compartments within said quadrangle, the ends of said second grid-forming members being attached to the side members adjacent said ends;
   (d) said first and second grid-forming members having slots therein at the points of intersection such that said first and second grid-forming members will interlock with each other to form said support grid;
   (e) each of said first and second grid-forming members being bent in alternate directions at intervals generally corresponding to the mid-point between said slots to form an undulating configuration with said bends forming relatively rigid arches extending into said fuel element compartments;
   (f) tabs extending outwardly from said first and second grid-forming members at locations generally corresponding to the locations of said bends in said grid-forming members, said tabs extending from said grid-forming members in a direction opposite to the corresponding bend in the grid-forming member, said tabs thereby forming relatively resilient spring members;
   (g) said grid-forming members being arranged in said quadrangle such that no more than two of said tabs extend into each of said fuel element compartments and such that the tabs extending into each compartment extend from adjacent sides of said compartment whereby a fuel element extending through one of said compartments will be supported on two adjacent sides by said tabs and on two other sides by portions of said grid-forming members generally corresponding to the point at which said grid-forming members are bent.

2. A fuel element support grid for supporting a bundle of fuel elements comprising a plurality of intersecting grid-forming members, said members forming a plurality of fuel element compartments, each of said fuel element compartments having top and bottom edges and four relatively rigid sides formed by portions of said members, relatively resilient spring means extending into each compartment from not more than two adjacent sides of said compartments, said spring means comprising portions of said grid-forming members partially severed from said members generally midway between said top and bottom edges and bent therefrom into said compartments along lines generally parallel with said fuel elements thereby leaving apertures in said members, said members having bends therein at locations generally corresponding to the location of said spring means to form arches above and below each spring means, the concave side of said arches being toward the corresponding spring means whereby corresponding spring means and arches extend into adjacent compartments, said spring means thereby adapted to engage fuel elements to force said fuel elements against said arches.

3. A fuel element support grid as claimed in claim 2 wherein successive spring means extend from each of said grid-forming members in alternate directions and successive bends in said members are in alternate directions thereby forming an undulating configuration.

4. A nuclear reactor fuel element assembly comprising a plurality of fuel elements, said fuel elements having top and bottom ends and being arranged generally parallel to each other and in a plurality of intersecting rows to form a fuel bundle, and at least one support grid supporting said fuel elements in said bundle intermediate the top and bottom ends thereof, said support grid comprising elongated thin metal bands interposed between adjacent rows of said fuel elements, said bands having a rectangular cross section, the short dimension of said cross section being perpendicular to said fuel elements and the long dimension of said cross section being parallel to said fuel elements, said metal bands being bent at points opposite adjacent fuel elements, said bends alternating in direction and forming relatively rigid supporting arches which engage said adjacent fuel elements in essentially line contact, successive bends engaging fuel element on opposite sides of said band, relatively flexible spring members extending from said bands at locations generally corresponding to and in the opposite direction from said bends, said spring members comprising thin metal sheets essentially rectangular in cross section, the short dimension of said cross section being perpendicular to said fuel element and the long dimension of said cross section being parallel to said fuel elements.

5. A nuclear reactor fuel element assembly as claimed in claim 4 wherein said metal bands have top and bottom edges and wherein said spring members comprise portions of said metal bands partially severed therefrom intermediate said top and bottom edges and bent outwardly therefrom along lines extending from the top to the bottom of said bands whereby said spring members will provide the minimum resistance to fluid flow in a direction parallel to said fuel elements.

6. A nuclear reactor fuel element assembly as claimed in claim 4 wherein said flexible spring members are formed from portions of said metal bands, said spring members being partially severed from said metal bands and bent outwardly therefrom along a line parallel to said fuel elements.

7. A nuclear reactor fuel element assembly as claimed in claim 6 wherein said spring members are bent back towards said metal band at points opposite said bends in said metal bands such that said spring members will engage adjacent fuel elements along said bends in essentially line contact.

8. A nuclear reactor fuel element assembly as claimed in claim 6 wherein said spring members are deformed arcuately so as to curve away from said fuel elements and engage said fuel elements in essentially line contact.

9. A nuclear reactor fuel assembly comprising a plurality of generally parallel fuel elements arranged in spaced relationship in intersecting rows, said assembly adapted to accommodate fluid flow longitudinally of said elements, support means at the longitudinal extremities of said elements to maintain said elements in said assembly and in said spaced relationship and grid means intermediate said support means for holding said elements against lateral movement, said grid means comprising a plurality of thin elongated bands longitudinally aligned and extending laterally across said assembly, there being one band between each adjacent row of elements, said bands thereby intersecting and forming compartments for said elements, said bands being bent intermediate said intersections so as to form relatively rigid arches which extend into certain ones of said compartments and outwardly from others of said compartments, relatively flexible spring tabs bent outwardly from said bands at locations generally corresponding to said arches in said bands, said spring tabs extending from said bands in the opposite direction from said arches, each of said compartments having two arches extending thereinto from adjacent sides and two spring tabs extending thereinto from the other two adjacent sides, said spring tabs forcing said elements against said arches opposite thereto and said arches thereby engaging said elements in essentially line contact.

10. A nuclear reactor fuel assembly as claimed in claim 9 and further including a thin strip of material around the periphery of said assembly longitudinally aligned with said bands, said bands being affixed to said strip of material.

11. A nuclear reactor fuel assembly as claimed in claim 10 wherein portions of said strip of material are adjacent fuel elements and wherein said strip of material has apertures therein at said adjacent portions to increase the rate of cooling at such locations.

12. A nuclear reactor fuel assembly as claimed in claim 9 wherein successive arches in said bands are in the opposite direction whereby one arch will extend into a compartment on one side of said band and the next arch will extend into a compartment on the opposite side of said band.

13. A nuclear reactor fuel assembly as claimed in claim 9 wherein said bands are slotted at said intersections so as to interlock with each other.

14. A nuclear reactor fuel assembly as claimed in claim 9 wherein said spring tabs are cut from said bands intermediate the edges thereof and bent outwardly therefrom along a line running parallel to said fuel elements and said fluid flow whereby said spring tabs will provide the minimum resistance to said fluid flow.

15. A nuclear reactor fuel assembly as claimed in claim 14 wherein the spring tabs cut and bent outwardly fdom said bands form substantially rectangular apertures in said bands and wherein said bends in said bands are approximately at the mid-point of said rectangular aperture.

16. A nuclear reactor fuel assembly as claimed in claim 15 wherein the dimension of said spring tabs in the longitudinal direction decreases with distance from the point at which said spring tabs are bent outwardly from said bands whereby the contact area of said spring tabs with said fuel elements will be reduced.

References Cited

UNITED STATES PATENTS

| 3,068,163 | 12/1962 | Currier et al. | 176—78 |
| 3,228,854 | 1/1966 | Bekkering et al. | 176—78 |
| 3,255,090 | 6/1966 | Leirvik | 176—76 |
| 3,255,091 | 6/1966 | Frisch | 176—76 X |
| 3,267,000 | 8/1966 | Ashcroft et al. | 176—78 X |
| 3,298,922 | 1/1967 | Prince et al. | 176—76 X |
| 3,301,764 | 1/1967 | Timbs et al. | 176—76 X |
| 3,301,765 | 1/1967 | Eyre et al. | 176—76 X |
| 3,350,275 | 10/1967 | Venier et al. | 176—78 |
| 3,377,254 | 4/1968 | Frisch | 176—78 |
| 3,379,617 | 4/1968 | Andrews et al. | 176—78 |

FOREIGN PATENTS

| 1,297,471 | 5/1962 | France. |
| 1,082,679 | 6/1960 | Germany. |
| 1,085,976 | 7/1960 | Germany. |
| 1,086,356 | 8/1960 | Germany. |
| 962,266 | 7/1964 | Great Britain. |
| 973,137 | 10/1964 | Great Britain. |

BENJAMIN R. PADGETT, *Primary Examiner.*

MELVIN J. SCOLNICK, *Assistant Examiner.*

U.S. Cl. X.R.

176—76